May 12, 1959

B. G. BJALME 2,885,698

ADJUSTABLE CAM OPERATED DIE HEAD

Filed May 14, 1957

2 Sheets-Sheet 1

INVENTOR.
Bengt G. Bjalme
BY Ralph Hammar
Attorney

May 12, 1959

B. G. BJALME 2,885,698

ADJUSTABLE CAM OPERATED DIE HEAD

Filed May 14, 1957

2 Sheets-Sheet 2

INVENTOR.
Bengt G. Bjalme
BY
Ralph Hammar
Attorney

United States Patent Office 2,885,698
Patented May 12, 1959

2,885,698

ADJUSTABLE CAM OPERATED DIE HEAD

Bengt G. Bjalme, Erie, Pa., assignor to Reed Manufacturing Company, Erie, Pa., a corporation of Pennsylvania Application May 14, 1957, Serial No. 659,132

3 Claims. (Cl. 10—122)

This invention is a quick opening pipe die having thread cutting chasers moved radially by a cam plate journaled on the frame of the die and which is quickly adjustable to any one of a plurality of sizes of pipe. In each adjusted position, swinging a handle through an arc of 180° moves the cam plate to open or close the die depending upon the direction of movement. In one extreme position of the handle, for example, the closed position, it engages a spring stop which when overcome releases a latch and permits movement of the cam plate relative to the frame to a position corresponding to a different size pipe. By having the adjustment of the die to different pipe sizes controlled by the same handle which opens and closes the die, adjustment of the die to different pipe sizes can be quickly and easily made. This is important because the die will frequently be used to cut threads on many different sizes of pipe and the ability to quickly change from one size to another makes it easy to thread the pipe as it is needed.

Figure 1:
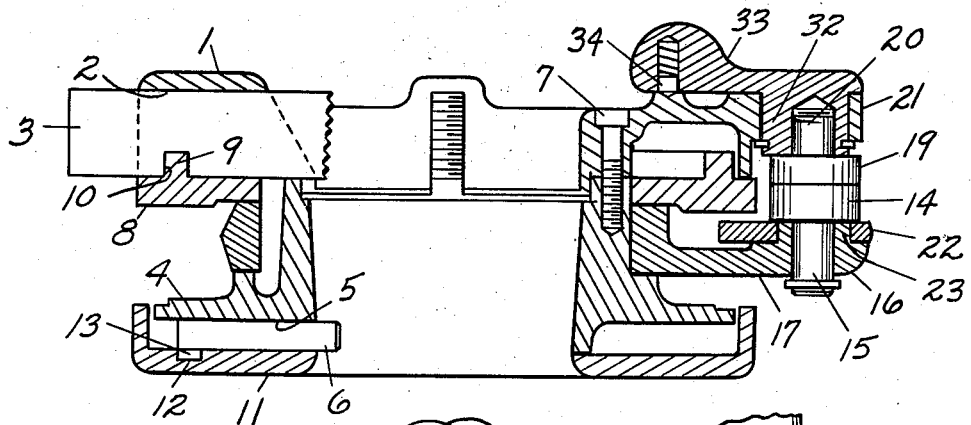
Figure 2:
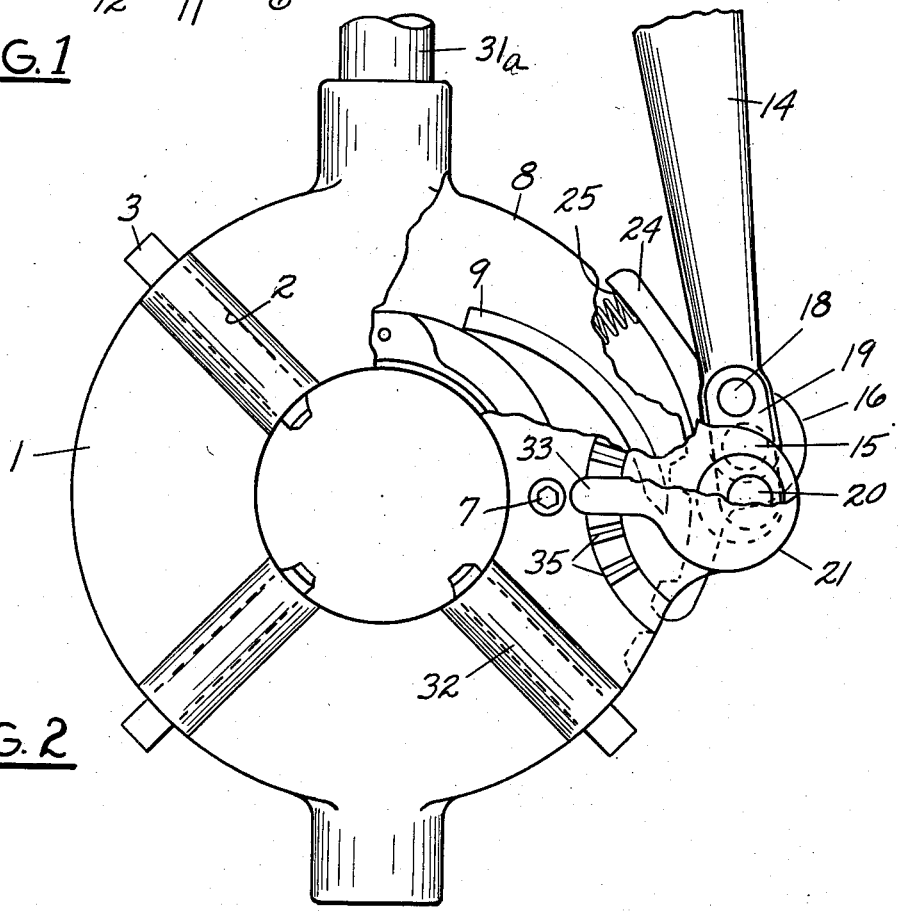
Figure 3:
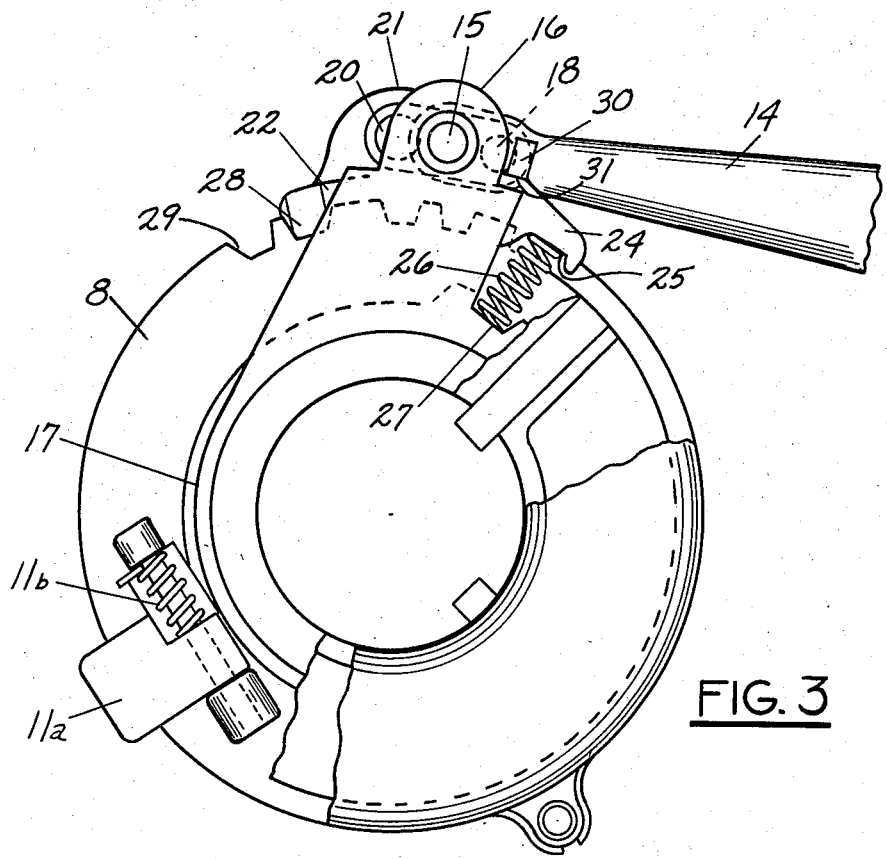
Figure 4:
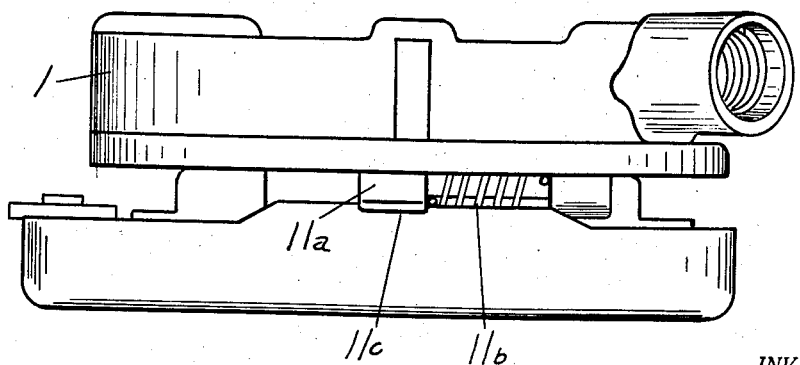

In the accompanying drawing, Fig. 1 is a sectional side elevation of a pipe threading die; Fig. 2 is a fragmentary front view; Fig. 3 is a rear view, partly broken away, and Fig. 4 is an edge view showing the connection between the guide and chaser cam members. The die has a front housing 1 with radial slots 2 for thread cutting chasers 3 and a back housing 4 with radial slots 5 for guide members 6. The front and back housings are secured together by cap screws 7 and form the frame of the die. Journaled on the front end of the housing 4 is a chaser cam plate 8 having spirally directed projections 9 fitting in notches 10 in the thread cutting chasers 3 so that as the cam plate is rotated relative to the frame, the thread cutting chasers 3 are moved radially outward or inward depending upon the direction of rotation. At the rear of the housing 4 is journaled a guide cam plate 11 having spirally directed grooves 12 receiving tangs 13 on the guide members 6. Rotation of the guide cam plate 11 relative to the housing 4 causes radial inward or outward movement of the guide members depending upon the direction of rotation. The parts so far described are disclosed in greater detail in application Serial No. 591,084, filed June 30, 1955, now U.S. Patent No. 2,760,213 issued August 28, 1956, where there is in addition shown a resilient connection between the chaser cam plate 8 and the guide cam plate 11 so that the thread cutting chasers and the guide members are simultaneously opened and closed without interfering in any way with the accuracy of the thread or requiring separate adjustment of the guide members so as to accommodate variations in the pipe diameter. The resilient connection comprises catch 11a on the chaser cam plate 8 biased by spring 11b into notch 11c on the guide cam plate.

In the use of the die, at the start of each thread cutting operation the thread cutting chasers are closed and at the end of the cut the thread cutting chasers are opened so as to permit quick removal of the die from the pipe. This opening and closing of the die is effected by a handle 14 pivoted by means of a pin 15 in an ear 16 on a ring 17 journaled on the rear housing 4. The handle 14 projects beyond the pin 15 and is pivoted at 18 to one end of a link 19. The other end of the link 19 is pivoted by means of a pin 20 in an ear 21 on the front housing 1. The link 19 in conjunction with the portion of the handle 14 between the pivots 15 and 18 comprise from one aspect a toggle which is movable between extended and folded positions. In the folded position shown in Figs. 2 and 3, the die is closed while in the extended position where the handle is turned to an arc of 180° from the position shown in Figs. 2 and 3, the die is in the open position. For the described movement of the handle 14 to open and close the die, it is necessary that there be some connection between the ring 17 in which the handle 14 is pivoted and the chaser cam plate 8. This connection is effected through a latch 22 pivoted at its center on a boss 23 on the ear 16 surrounding the pivot pin 15 for the handle 14. The latch has on one side of the boss 23 an arm 24 provided with a seat 25 for a spring 26 seated at its other end on a seat 27 on the ring 17. The spring 26 biases the latch in a clockwise direction as viewed in Fig. 2 (counterclockwise as viewed in Fig. 3) and urges a detent 28 on the latch member into engagement with the selected notch 29 in the chaser cam plate 8. The notches 29 are so spaced that each notch corresponds to a different pipe size and accordingly the die can be adjusted from one pipe size to another by merely moving the detent 28 to a different notch 29.

The movement of the latch 22 to change from one pipe size to another is effected through the handle 14, when the handle is at one extreme position, for example, the closed position of the die shown in Figs. 2 and 3. In this position, a projection 30 on the handle engages a flat surface 31 on the arm 24 of the latch. The spring 26 is quite stiff so that under any normal forces occurring during the use of the die, the surface 31 is effectively a rigid stop for the handle. However, by exerting a downward force on the handle 14, the spring 26 is overcome and the latch 22 can be pivoted in the direction to lift the detent 28 out of the notch 29. Then, by holding the guide cam plate 11 and moving the handle 14 relative to it circumferentially in the desired direction, the detent can be positioned above another notch 29 corresponding to the new pipe size to be threaded. The same relative movement could be effected by moving the chaser cam plate 8 relative to the handle in the released position of the latch 22, but since the guide and chaser cam plates are connected together, it is usually easier to move the guide cam plate because it is more accessible. The downward pressure on the handle 14 can be very easily exerted because in the closed position of the die shown in Fig. 2, it is directly above the handle 31a to turn the die for manual threading.

So long as the die is used for cutting threads on one size of pipe, it is merely opened and closed by the handle 14. When the die is to be changed to cut a different size thread, the latch 22 is moved so that its detent 28 engages a different notch 29. This is effected by the same handle 14 used to open and close the die but there is no danger of accidentally changing the adjustment of the die because it requires a conscious effort on the part of the operator to overcome the tension of the stiff spring 26.

Under some circumstances, it is necessary to cut threads which are one or more turns over or under size in order that the pipe may be threaded into fittings which are over or under size. A pipe thread is said to be one turn over size when it is tightened in one turn less than the standard size thread. The over or under size adjustment is effected by an eccentric 32 journaled in the ear 21 on the front housing 1 and turned by a handle 33 carrying a detent 34 which cooperates with notches 35 on the front housing 1. In the position shown in Fig. 2, the handle 33 is at its central position and the die will cut threads of standard size. Moving the handle to the right or left from the center position will cause the die to cut threads which are over or under size. The notches 35 are spaced so that each notch corresponds to one turn difference in thread size.

What is claimed as new is:

1. A thread cutting die of the type having a frame carrying radially movable thread cutting chasers, and a cam member journaled on the frame for moving the chasers radially, a shoe journaled on the frame, a pair of toggle links pivoted to each other and respectively pivoted on the shoe and frame, a handle oscillatable through a path for turning one of the toggle links to move the shoe back and forth relative to the frame, a latch mounted on the shoe and engageable with the cam member in a plurality of connecting positions, each position corresponding to a different pipe size and any one of which when connected causing the die to open and close as the shoe is moved back and forth relative to the frame, a spring biasing the latch to connecting position, and a normally ineffective connection between the latch and handle engageable by movement of the handle beyond said path to move the latch out of connecting relation to permit change of relative angular position of the shoe and cam member.

2. A thread cutting die of the type having a frame carrying radially movable thread cutting chasers, and a cam member journaled on the frame for moving the chasers radially, said cam member and frame comprising relatively movable members, a shoe journaled on the frame, a pair of toggle links pivoted to each other and respectively pivoted to the shoe and to one of said relatively movable members, a handle oscillatable through a path for turning one of the toggle links to move the shoe back and forth relative to said one relatively movable member, a latch mounted on the shoe and engageable with said other relatively movable member in a plurality of connecting positions, each position corresponding to a different pipe size and any one of which when connected causing the die to open and close as the shoe is moved back and forth relative to said one relatively movable member, and a part on the handle engageable with a part on the latch at one end of said path to move the latch from connecting position to permit change of relative angular position of the shoe and said other relatively movable member.

3. A thread cutting die of the type having a frame carrying radially movable thread cutting chasers, and a cam member journaled on the frame for moving the chasers radially, said cam member and frame comprising relatively movable members, a shoe journaled on the frame, a pair of toggle links pivoted to each other and respectively pivoted to the shoe and to one of said relatively movable members, a handle oscillatable through a path for turning one of the toggle links to move the shoe back and forth relative to said one relatively movable member, a latch mounted on the shoe and engageable with said other relatively movable member in a plurality of connecting positions, each position corresponding to a different pipe size and any one of which when connected causing the die to open and close as the shoe is moved back and forth relative to said one relatively movable member, and means for transmitting a force from the handle to the latch for moving the latch out any of said connecting positions to permit change of the relative angular position of the shoe and said other relatively movable member to bring the latch to another connecting position.

No references cited.